United States Patent
Cao

(10) Patent No.: US 10,659,454 B2
(45) Date of Patent: May 19, 2020

(54) SERVICE AUTHORIZATION USING AUXILIARY DEVICE

(71) Applicant: Alibaba Group Holding Limited, Grand Cayman (KY)

(72) Inventor: Kai Cao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 191 days.

(21) Appl. No.: 15/490,324

(22) Filed: Apr. 18, 2017

(65) Prior Publication Data

US 2017/0223016 A1 Aug. 3, 2017

Related U.S. Application Data

(63) Continuation of application No. 14/685,351, filed on Apr. 13, 2015, now Pat. No. 9,660,985.

(30) Foreign Application Priority Data

Apr. 15, 2014 (CN) .......................... 2014 1 0150396

(51) Int. Cl.
*H04L 29/06* (2006.01)
*H04L 9/32* (2006.01)
(Continued)

(52) U.S. Cl.
CPC .......... *H04L 63/0853* (2013.01); *G06F 21/34* (2013.01); *G06F 21/44* (2013.01);
(Continued)

(58) Field of Classification Search
CPC .... H04L 63/08; H04L 63/0853; H04W 12/00; H04W 12/0023; H04W 12/004;
(Continued)

(56) References Cited

U.S. PATENT DOCUMENTS 8,302,167 B2  10/2012  Mennes et al.
9,119,069 B1   8/2015  Vipond et al.
(Continued)

FOREIGN PATENT DOCUMENTS

CN   101321067 A   12/2008
CN   101964793 A   2/2011
(Continued)

OTHER PUBLICATIONS

The Extended European Search Report dated Oct. 17, 2017 for European Patent Application No. 15780259.6, 6 pages.
(Continued)

*Primary Examiner* — Daniel B Potratz
(74) *Attorney, Agent, or Firm* — Lee & Hayes, P.C.

(57) ABSTRACT

Implementations of the present disclosure relate to systems and methods for service authorization. A server terminal device may receive user authentication information that is stored on the auxiliary device for user authentication associated with an authentication device. Based on the user authentication information, the server terminal device may then determine whether the authentication device meets the authentication condition. The implementations further relate to methods and systems for requesting service authorization.

18 Claims, 11 Drawing Sheets

(51) Int. Cl.
    *G06F 21/34*     (2013.01)
    *G06F 21/44*     (2013.01)
    *H04L 9/30*     (2006.01)

(52) U.S. Cl.
    CPC ............... *H04L 9/30* (2013.01); *H04L 9/321* (2013.01); *H04L 9/3226* (2013.01); *H04L 9/3228* (2013.01); *H04L 9/3234* (2013.01); *H04L 63/04* (2013.01); *H04L 63/083* (2013.01); *H04L 63/10* (2013.01); *H04L 63/123* (2013.01); *H04L 63/18* (2013.01)

(58) Field of Classification Search
    CPC ... H04W 12/06; H04W 12/0609; G06F 21/31; G06F 21/33
    See application file for complete search history.

(56) References Cited

U.S. PATENT DOCUMENTS

| | | | |
|---|---|---|---|
| 9,130,753 | B1 | 9/2015 | Kronrod et al. |
| 9,398,005 | B1 | 7/2016 | Qiao |
| 2004/0078573 | A1 | 4/2004 | Matsuyama |
| 2005/0033994 | A1* | 2/2005 | Suzuki ............... H04L 63/083 726/19 |
| 2006/0200735 | A1 | 9/2006 | Ormond |
| 2006/0242404 | A1 | 10/2006 | Su |
| 2006/0281442 | A1 | 12/2006 | Lee et al. |
| 2007/0204149 | A1* | 8/2007 | Balfanz ............... G06Q 20/382 713/156 |
| 2008/0151847 | A1 | 6/2008 | Abujbara |
| 2008/0255991 | A1 | 10/2008 | Wang |
| 2010/0024024 | A1 | 1/2010 | Siourthas et al. |
| 2010/0100928 | A1 | 4/2010 | Gasparini et al. |
| 2011/0202466 | A1* | 8/2011 | Carter ............... G06Q 20/20 705/67 |
| 2012/0204233 | A1 | 8/2012 | Rubio |
| 2013/0311783 | A1* | 11/2013 | Heidenreich ......... H04L 9/3247 713/176 |
| 2013/0332293 | A1 | 12/2013 | Ran |
| 2013/0346753 | A1* | 12/2013 | Boysen ............... H04L 9/0863 713/168 |
| 2014/0068741 | A1 | 3/2014 | Brown et al. |
| 2014/0189808 | A1* | 7/2014 | Mahaffey ............... H04L 63/083 726/4 |
| 2015/0172280 | A1* | 6/2015 | Song ............... H04L 9/0861 726/6 |
| 2015/0295921 | A1 | 10/2015 | Cao |
| 2019/0236584 | A1* | 8/2019 | Huxham ............... H04L 63/068 |

FOREIGN PATENT DOCUMENTS

| | | |
|---|---|---|
| CN | 102164036 A | 8/2011 |
| CN | 103001975 A | 3/2013 |
| DE | 10039569 | 12/2001 |
| EP | 1703479 | 9/2006 |
| GB | WO2013050738 A2 | 4/2013 |
| JP | 2007065801 | 3/2007 |
| JP | 2007108973 | 4/2007 |
| JP | 2009009235 | 1/2009 |
| JP | 2011141785 | 7/2011 |
| WO | WO2005098764 | 10/2005 |
| WO | WO2009149723 | 12/2009 |

OTHER PUBLICATIONS

Translation of Search Report from Chinese Office Action dated Nov. 6, 2017 for CN Application 201410150396.8, a foreign corresponding application of U.S. Appl. No. 14/685,351, 14 pages.

The PCT Search Report and Written Opinion dated Jul. 24, 2015 for PCT application No. PCT/US15/25586, 8 pages.

Office action for U.S. Appl. No. 14/685,351, dated Jun. 17, 2016, Cao, "Service Authorization using Auxiliary Device", 24 pages.

Translation of Office Action dated Jan. 8, 2019, from corresponding CN Patent Application 201410150396.8, 5 pages.

Translation of Chinese Office Action dated Jul. 20, 2018, from corresponding CN Patent Application 201410150396.8, 15 pages.

Translation of Supplemental Search Report dated Jul. 9, 2018, from corresponding CN Patent Application 201410150396.8, 2 pages.

The Japanese Office Action dated Feb. 12, 2019 for Japanese Patent Application No. 2016-561004, a counterpart of U.S. Pat. No. 9,660,985, 16 pages.

Search Report dated Oct. 26, 2017, from corresponding CN Patent Application 201410150396.8, 2 pages.

Supplemental Search Report dated May 16, 2019, from corresponding CN Patent Application 201410150396.8, 1 page.

Machine translation of third Office Action dated Jan. 8, 2019, from corresponding CN Patent Application 201410150396.8, 8 pages.

The European Office Action dated Nov. 20, 2019 for European Patent Application No. 15780259.6, a counterpart of U.S. Pat. No. 9,660,985, 4 pages.

The Translated Korean Office Action dated Jan. 15, 2020 for Korean Patent Application No. 2016-7027707, a counterpart of U.S. Pat. No. 9,660,985, 15 pages.

\* cited by examiner

SERVICE AUTHORIZATION USING
AUXILIARY DEVICE

CROSS REFERENCE TO RELATED PATENT
APPLICATIONS

This application is a continuation of co-pending U.S. patent application Ser. No. 14/685,351, filed Apr. 13, 2015, entitled "Service Authorization Using Auxiliary Device," which claims priority to Chinese Patent Application No. 201410150396.8, filed on Apr. 15, 2014, entitled "A Method and a System for Service Authorization and Requesting Service Authorization," which are hereby incorporated by reference in their entirety.

TECHNICAL FIELD

Implementations of the present disclosure relate to the field of computer technology, and more particularly to methods and systems for service authorization.

BACKGROUND

Under conventional technologies, internet-based service authorization (e.g., remote payment authorization) typically includes the following operations. For example, a user terminal device gets user information including a user account name and password, and submits the information to a server terminal device for verification. The service terminal device then validates the user information, and then authorizes a service permission if validation is successful. After the user terminal device obtains service authorization, the user terminal device may access service data.

However, implementations of the conventional technologies may require, for example, that a user manually enter the account name and password into the user terminal device. This results in poor user experience and low efficiency of the authorization process.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

Implementations of the present disclosure relate to a method for service authorization. The method may include receiving, by a server terminal device, user authentication information stored on an auxiliary device for user authentication associated with a user terminal device. The server terminal device may further determine whether the user terminal device meets an authorization condition based on the user authentication information.

Implementations of the present disclosure further relate to a method for requesting authorization. The method may include receiving, by an auxiliary device for user authentication, an auxiliary authentication request from a user terminal device. The auxiliary device for user authentication may obtain user authentication information and transmit the user authentication information to a server terminal device such that the server terminal device determines, based on the user authentication information, whether the user terminal device meets an authentication condition.

Implementations of the present disclosure further relate to another method for requesting authorization. The method may include providing, by a user terminal device, an auxiliary authentication request to an auxiliary device for user authentication such that the auxiliary device for user authentication transmits user authentication information to a server terminal device for further service authorization.

Implementations of the present disclosure further relate to yet another method for requesting authorization. The method may include receiving, by a user terminal device, user authentication information from an auxiliary device for user authentication associated with the user terminal device. The terminal device may transmit the user authentication information to a server terminal device such that the server terminal device determines whether the user terminal device meets authorization condition.

Implementations of the present disclosure further relate to a system for service authorization. The system may include one or more processors, and memory to maintain a plurality of components executable by the one or more processors. The plurality of components may include an information receiving module configured to receive user authentication information stored on an auxiliary device for user authentication associated with a user terminal device, and a determining module configured to determine whether the user terminal device meets an authorization condition based on the user authentication information.

Implementations of the present disclosure further relate to another system for service authorization. The system may include one or more processors, and memory to maintain a plurality of components executable by the one or more processors. The plurality of components may include a request obtaining module configured to receiving from a user terminal device an auxiliary authentication request, an information obtaining module configured to obtain user authentication information from the auxiliary device for user authentication, and a transmitting module configured to transmit the user authentication information to a server terminal device such that the server terminal device determines, based on the user authentication information, whether the user terminal device meets a authentication condition.

Implementations of the present disclosure further relate to yet another system for service authorization. The system may include one or more processors, and memory to maintain a plurality of components executable by the one or more processors. The plurality of components may include a request providing module configured to provide an auxiliary authentication request to an auxiliary device for user authentication such that the auxiliary device for user authentication transmits user authentication information to a server terminal device for further service authorization.

Implementations of the present disclosure further relate to yet another system for service authorization. The system may include one or more processors, and memory to maintain a plurality of components executable by the one or more processors. The plurality of components may include an information receiving module configured to receive user authentication information from an auxiliary device for user authentication associated with a user terminal device, and a transmitting module configured to transmit the user authentication information to a server terminal such that the server terminal determines whether the user terminal device meets authorization condition.

An auxiliary device for user authentication may store the user authentication information such that the user terminal device and/or an auxiliary device for user authentication may transmit user identification information to the server terminal device for the service authorization. This makes the authorization process efficiently.

BRIEF DESCRIPTION OF THE DRAWINGS

The Detailed Description is described with reference to the accompanying figures. The use of the same reference numbers in different figures indicates similar or identical items.

DETAILED DESCRIPTION

The following accompanying drawings and detailed description of the technical solutions provided by various implementations of the present disclosure. Obviously, the described implementations are merely part of implementations of the present disclosure, but not all implementations. Based on the implementations in the present disclosure, all the other implementations made by those of ordinary skill without creative efforts are within the scope of protection of the present disclosure.

Figure 1:
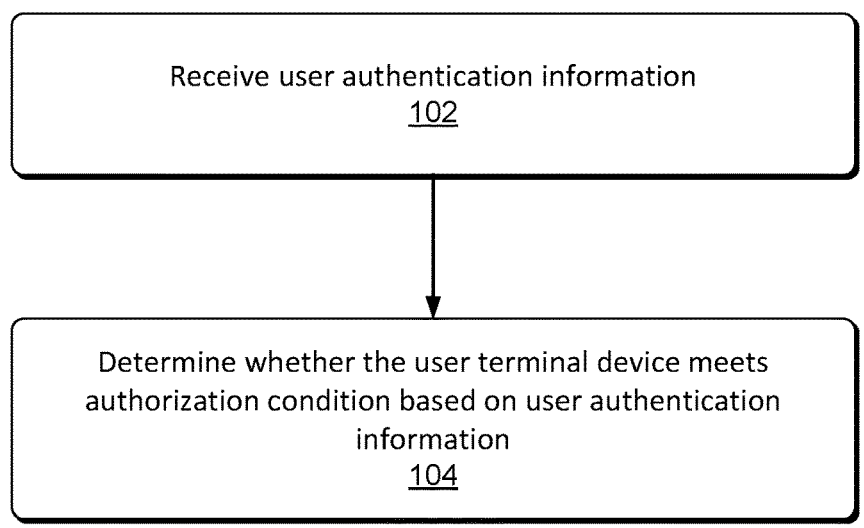
FIG. 1 is a flow chart of an illustrative process for service authorization.

FIG. 1 is a flow chart of an illustrative process for service authorization. At 102, a server terminal device may receive user authentication information stored on an auxiliary device for user authentication associated with a user terminal device. The user authentication information may include a user name, a user account name, and/or a related password, and may further contain other information that uniquely indicates and/or identifies a user.

The auxiliary device for user authentication may include mobile phones, desktop computers, laptops or tablet PCs, and other devices. The user authentication information may be obtained by and stored on the auxiliary device for user authentication in various ways. For example, the server terminal device may transmit the user identification information to the auxiliary device for user authentication directly or via the user terminal device after the auxiliary device for user authentication and/or the user terminal device successfully registers to the server terminal device. In some implementations, a user may directly enter user authentication information to the auxiliary device for user authentication. In some implementations, during the service authorization, the user authentication information may be transmitted by the auxiliary device for user authentication to the server terminal device directly or via the user terminal device.

At 104, the server terminal device may determine whether the user terminal device meets an authentication condition based on the received user authentication information. In some instances, the server terminal device may authorize a service permission to the user terminal device such as to allow the user terminal device to use user identify information of the user terminal device, for example, to perform transactions related to user accounts and/or access to contact information associated with a service.

In some implementations, the service authorization may be implemented using time-based dynamic passwords. In these instances, the user authentication information may include user verification information and user identification information (e.g., a user account name and password). The verification information may be obtained by using auxiliary device for user authentication to encrypt first time information and random information stored on the auxiliary device for user authentication. The first time information may include a system local time when the auxiliary device for user authentication receives an auxiliary authentication request. The random information may be provided by the serve terminal device to the auxiliary device for user authentication after the user identification information provided by the auxiliary device for user authentication is verified. The auxiliary authentication request may trigger the auxiliary device for user authentication to provide the user authentication information to the server terminal device such that the server terminal device may determine whether the user terminal device meets the conditions of authorization based on the received user authentication information.

In some implementations, the server terminal device may locate and/or identify auxiliary information provided by the auxiliary device for user authentication based on the saved user identity mapping between user identification information and the random information. The auxiliary information may include the user identification information and the mapped random information.

In some implementations, the user identification information may be verified when the auxiliary device for user authentication registers to the server terminal device. If the verification is successful, a mapping relationship may be established. The mapped random information may be randomly generated by the server terminal device.

For example, an auxiliary device authentication account named "apple" and having a password "12345" may be used as registered user identity information with respect to the server terminal device. The server terminal device may generate random information, such as a random string: A, and a mapping relationship among A, "apple" and "12345." Accordingly, when an auxiliary equipment transmits an "apple" and "12345" as the user authentication information to the server terminal device, the server terminal device may determine that the "apple" and "12345" are mapped to the random string A.

In some implementations, the server terminal device may encrypt second time information and related random information to obtain registration information. The second time information may include a system local time when the server terminal device receives the user identification information.

The encryption algorithm may include a cryptographic hash function, such as may be the Secure Hash Algorithm (SHA). The encryption algorithm and encryption algorithm may be implemented to generate verification information.

In some implementations, the server terminal device may determine whether the registration information and verification information of the user authentication information match. When the verification information and registration information match, the server terminal device may determine that verification information meets the authorization condition. When the verification information and the registration information do not match, the server terminal device may determine the verification information does not meet the authorization condition.

In some implementations, asymmetric keys may be implemented for the service authorization. For example, the user authentication information may include the verification information and user identification information. The auxiliary device for user authentication may encrypt an authentication label to obtain the verification information. The server terminal device may provide a private key to the user authentication information after the user identification information is verified. After receiving the auxiliary authentication request, the server terminal device may transmit the authentication label to the user terminal device, which may then transmit the authentication label to the auxiliary device for user authentication.

In some implementations, the server terminal device may further determine, based on the received user authentication information, whether the user terminal device meet the authentication condition in various ways. For example, the server terminal device may find and/or determine user identity information corresponding to the user authentication information associated with an auxiliary device that transmits the authentication public key to the server terminal device.

The server terminal device may obtain information to be certified to use the public key to decrypt a verification authentication token. The server terminal device may determine whether the information to be certified and the user identification information corresponding to the stored authentication label match. If the information to be certified and the authentication label match, the server terminal device may determine that the verification information meet the authorization condition.

If the information to be certified and the authentication label do not match, the server terminal device may determine that the verification information does not meet the authorization condition;

In some implementations, prior to receiving the user authentication information, the server terminal device may receive the user authentication request. Based on the user authentication request, the server terminal device may generate a service serial number and a mapping relationship between the service serial number and the user authentication request. The server terminal device may transmit the service serial number and the mapping relationship to the user terminal device. In these instances, the user authentication request may include the identifier information of a user terminal device.

Based on user authentication information, the server terminal devices may receive the service serial number and the user authentication request. Using the identifier information of a user terminal device, the server terminal device may determine whether the user terminal device meets the conditions. In these instances, when the user authentication information is transmitted by the auxiliary device for user authentication to the service terminal device, the server terminal device may receive the service serial number provided by the auxiliary device for user authentication. The user authentication information is obtained by the user terminal device provided by the user authentication information and the user authentication information is transmitted to the server terminal device; the received service serial number of the service may be transmitted by the user terminal device.

In some implementations, information exchange between the user terminal device and auxiliary device for user authentication may implement various techniques such as sound waves, Bluetooth, wireless fidelity (Wi-Fi), Near-field wireless communications (NFC), two-dimensional code image, and other techniques.

An auxiliary device for user authentication may store the user authentication information such that the user terminal device and/or an auxiliary device for user authentication may transmit user identification information to the server terminal device. This makes the authorization process efficiently.

Operations described above may be implemented by one or more devices. For example, when the auxiliary device for user authentication uses account information (e.g., "apple" and the password "12345") to register to the server terminal device. The server terminal device may generate random information, such as a random string (e.g., A), and establish a mapping relationship among A, "apple" and "12345".

Figure 2:
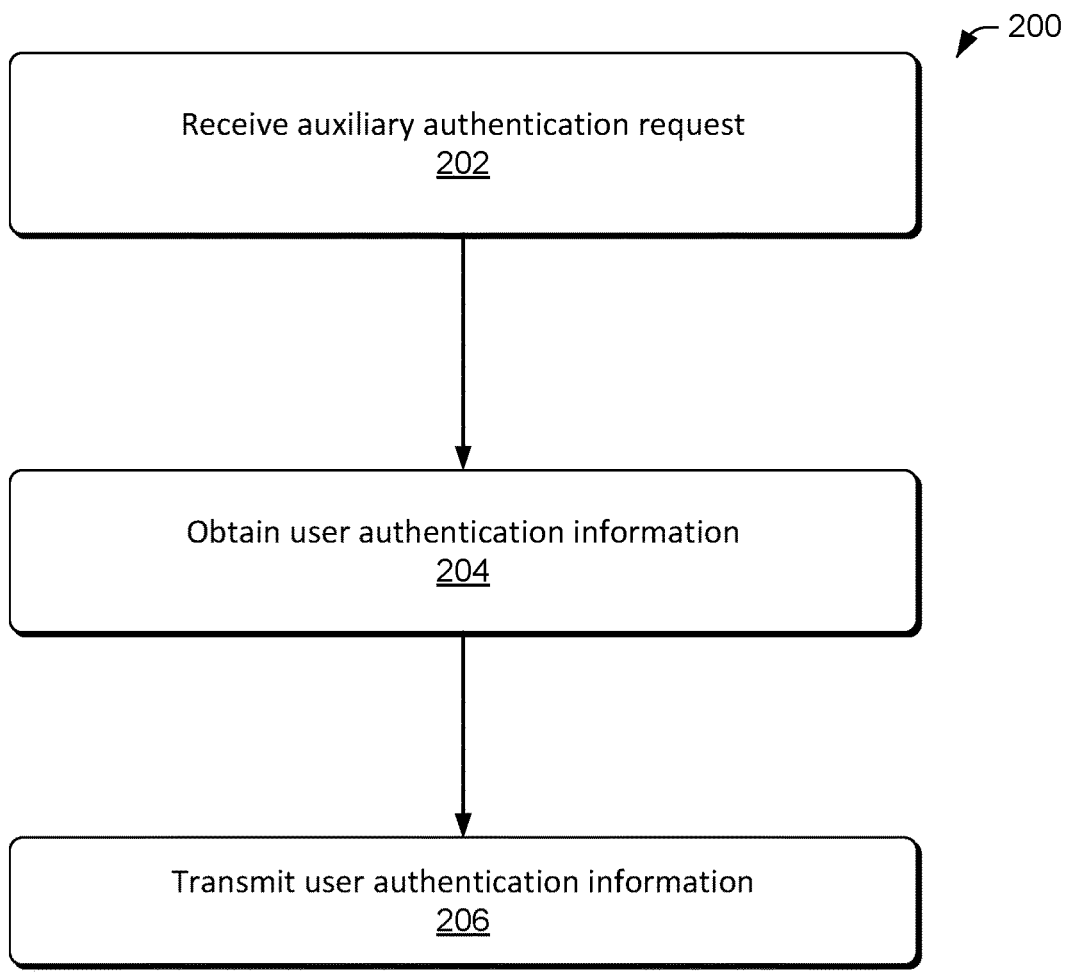
FIG. 2 is a flow chart of an illustrative process for requesting service authorization.

FIG. 2 is a flow chart of an illustrative process for requesting service authorization. At 202, the user authentication may obtain an identity authentication request from the use terminal device. The auxiliary authentication request may be obtained via a variety of ways. For example, the auxiliary authentication request may be received via a broadcast of the user terminal device and/or by scanning two-dimensional code image.

At 204, the user terminal device may obtain the user identification information from the auxiliary device for user authentication in response to the identity authentication request.

At 206, the user terminal device may transmit the user authentication information to the server terminal device such that the server terminal device may determine whether the authentication condition is met based on the user authentication information.

The user terminal device may transmit the user authentication information to the server terminal device. In some instances, the auxiliary device for user authentication may transmit the user authentication information to the server terminal device directly.

An auxiliary device for user authentication may store user authentication information such that the user terminal device and/or an auxiliary device for user authentication may transmit the user identification information to the server terminal device. This makes the authorization process efficiently.

Operations described above may be implemented by one or more devices. For example, when the auxiliary device for user authentication uses account information (e.g., "apple" and the password "12345") to register to the server terminal device. The server terminal device may generate random information, such as a random string (e.g., A), and establish a mapping relationship among A, "apple" and "12345".

Figure 3:
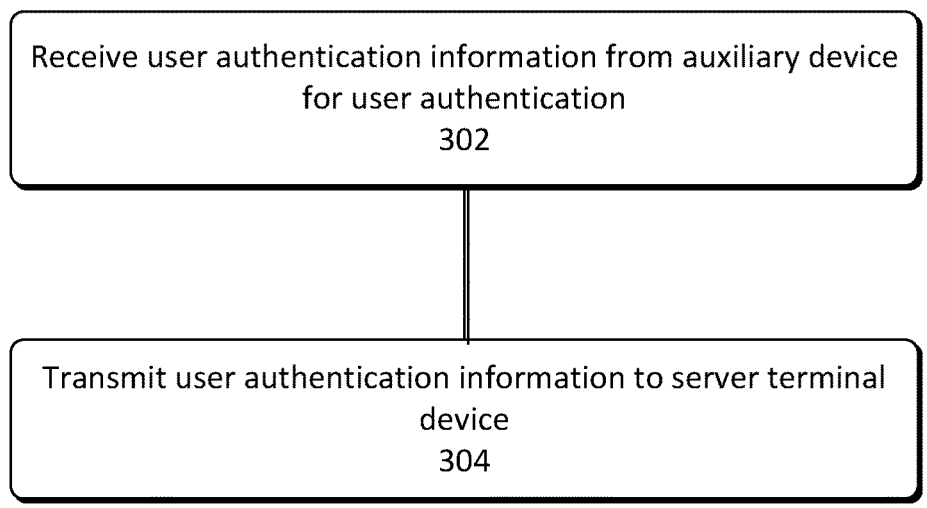
FIG. 3 is another flow chart of an illustrative process for requesting service authorization.

FIG. 3 is another flow chart of an illustrative process for requesting service authorization. The user terminal device may transmit the auxiliary authentication request to the auxiliary device for user authentication such that the auxiliary device for user authentication may transmit the user authentication information to the server terminal device. In these instances, the auxiliary authentication request may include the service serial number that is obtained by the user terminal device and sent by the server terminal device for user authentication.

At 302, the user terminal device may receive the user authentication information provided by the auxiliary device for user authentication associated with the user terminal device.

At 304, the user terminal device may transmit the user authentication information to the server terminal device such that the server terminal device may determine whether the authentication condition is met based on the user authentication information.

In some embodiments, the user terminal device and the auxiliary device for user authentication may exchange information in various ways, such as sound waves, Bluetooth, Wi-Fi, NFC or two-dimensional code image and other techniques. Operations described above may be implemented by one or more devices.

Figure 4:
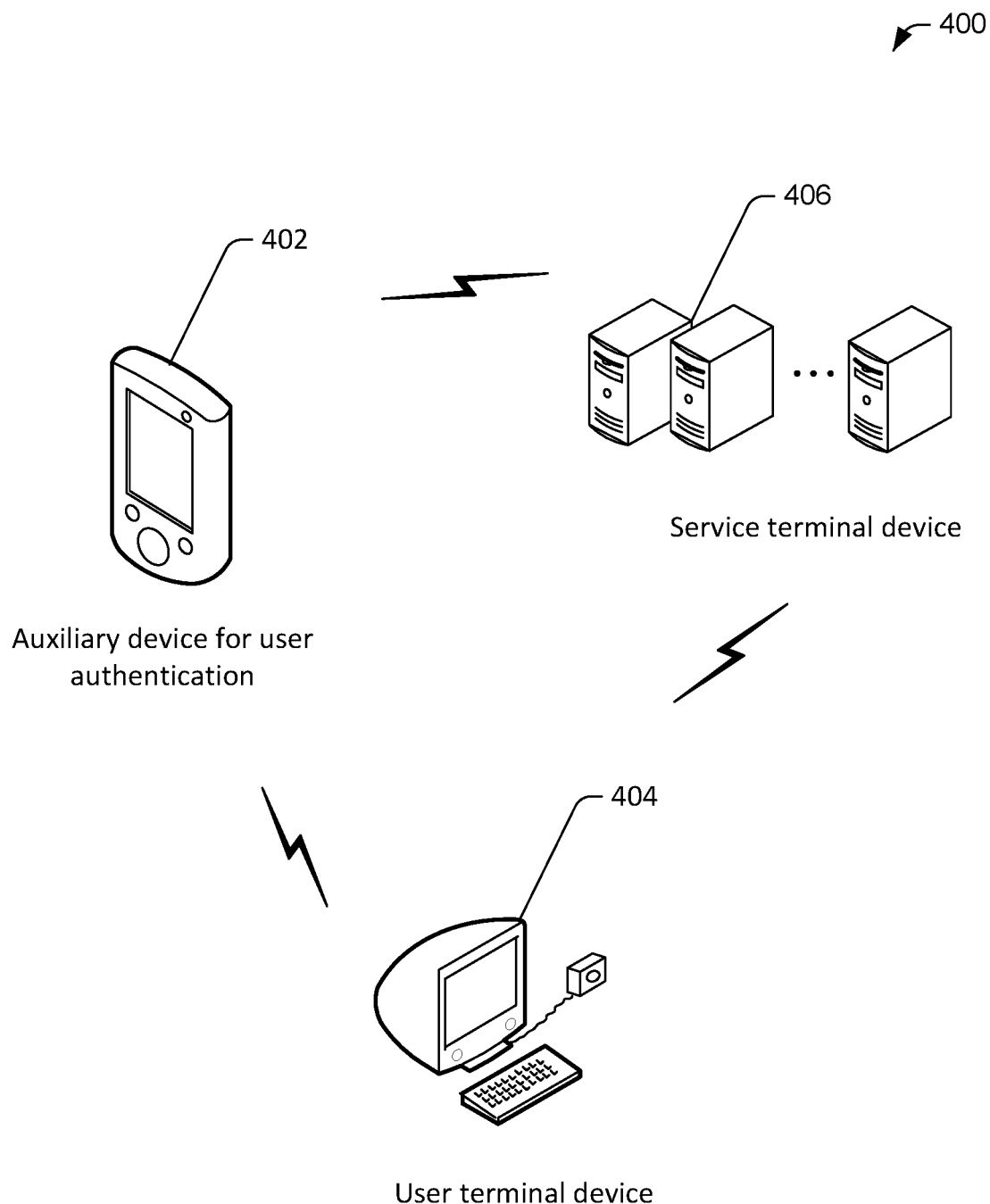
FIG. 4 is a schematic diagram of exemplary computing environment for service authorization.

FIG. 4 is a schematic diagram of exemplary computing environment for service authorization. As illustrated in FIG. 4, an auxiliary device for user authentication 402 (e.g., a mobile device) may be utilized for the service authorization. Using a dynamic password technology, the auxiliary device for user authentication 402 may implement authorization mechanisms with respect to a user terminal device 404 and a server terminal device 406. The mechanism does not require a user to initiate a user authentication request by entering account information (e.g., an account name and password), thereby increasing the efficiency of the authorization process and improving user experience.

The auxiliary device for user authentication 402 and/or the user terminal device 404 may include an auxiliary device processor, memory, network interfaces, signal transceiver devices such as mobile phones, tablet PCs, laptop, or desktop computers. In some implementations, the server terminal device 406 may be a network-terminal server. In particular, information exchange between independent authentication tools and the user terminal device 404 may implement various techniques, such as sound waves, Bluetooth, Wi-Fi, NFC or two-dimensional code image technology. Considering the cost, the auxiliary device for user authentication 402 and the user terminal device 404 may exchange information by implementing sound waves as a carrier.

Figure 5:
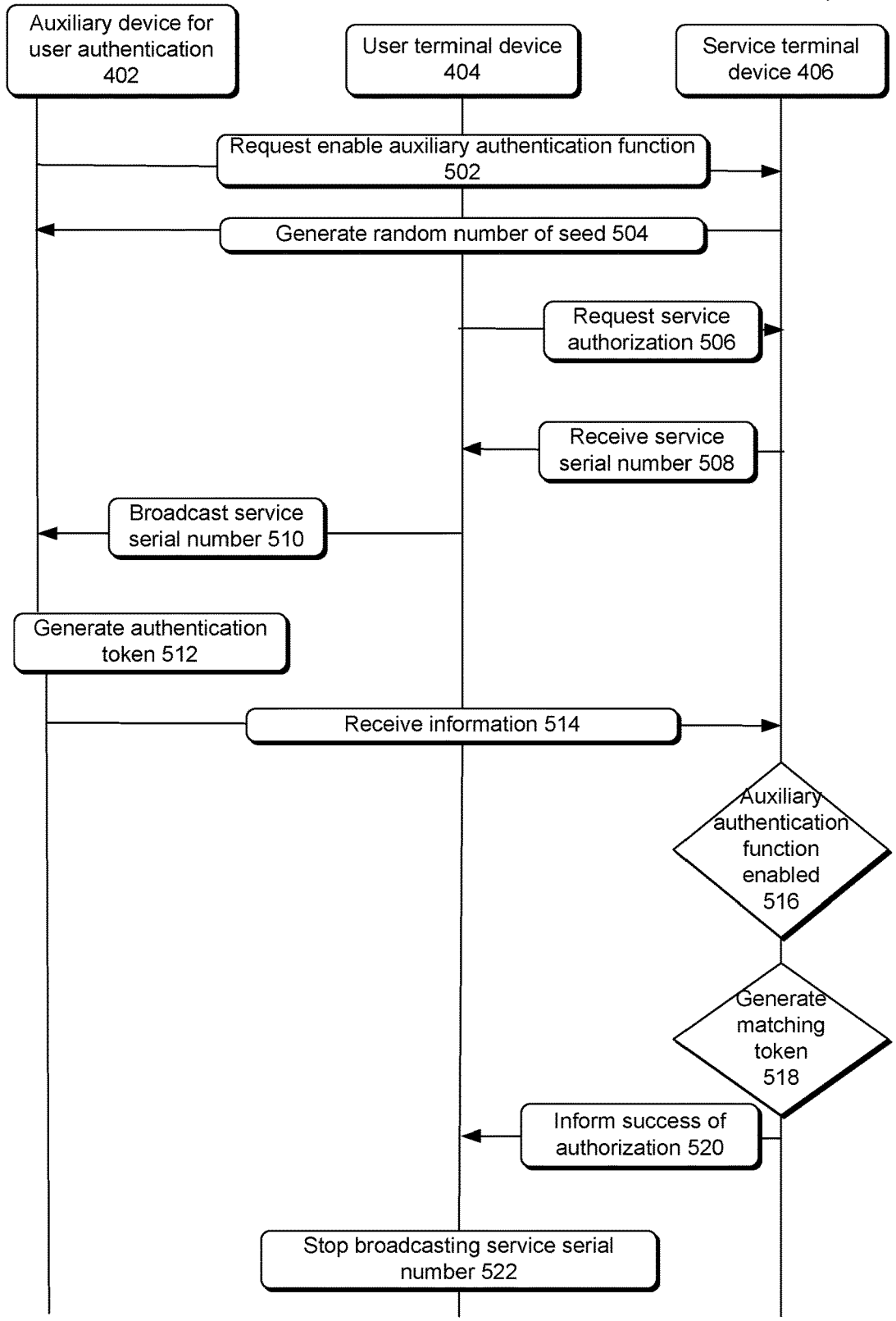
FIG. 5 is a schematic diagram of an illustrative process for service authorization.

FIG. 5 is a schematic diagram of an illustrative process for service authorization. At 502, the auxiliary device for user authentication 402 may request enabling an auxiliary authentication function. For example, the auxiliary device for user authentication 402 may, in the user's control, log on the server terminal device 406 via an auxiliary authentication client application associated with the auxiliary device for user authentication 402. The auxiliary device for user authentication 402 may then transmit a request for enabling the auxiliary authentication function. The request may include a user account and password, which are provided by a user.

In some implementations, a user may use a mobile device as the auxiliary device for user authentication 402 to transmit the request for enabling the auxiliary authentication function. In these instances, the server terminal device 406 may provide account payment services to the user.

504, after the auxiliary authentication function is enabled, the server terminal device 406 may generate a random number seed, which may be stored locally on the server terminal device 406 and/or the auxiliary device for user authentication 402.

For example, after the server terminal device 406 verifies the user account name and password, the server terminal device 406 may associate a state aid identification with the auxiliary device for user authentication 402. The identification may indicate that the auxiliary authentication function is enabled.

In some implementations, the server terminal device 406 may generate a globally unique random number seed (e.g., 16 bytes) binding to a user account, and distribute to the auxiliary device for user authentication 402 for encryption and storage. Accordingly, the auxiliary device for user authentication 402 may encrypt the random number seed and the user account, which are stored locally for user authentication The user account and the random number seed may be encrypted and stored on the auxiliary device for user authentication 402 and/or the server terminal device 406.

In some implementations, the user authentication may be implemented using a mobile phone as the auxiliary device for user authentication 402. For example, after receiving a random number seed W, the mobile device can be used to store the random number seed W and account information entered by a user. The mobile device may further encrypt the account information and the random number seed W such that the random number seed W may be obtained based on the user account information.

At 506, the user terminal device 404 may request service authorization. An additional user terminal device may be used to facilitate the service authorization request associated with the auxiliary device for user authentication 402.

Supposing that the user terminal device 404 is installed on a client terminal for service authorization for directing users to the service, and the client terminal may provide "auxiliary authentication" and "non-auxiliary authentication" as options. When the user selects the "auxiliary authentication" option, the user terminal device 404 may generate a service authorization request and transmit the service authorization request to the server terminal device 406. When the user selects the "non-auxiliary authentication" option, the user terminal device 404 may request the user to enter account information to log on the server terminal device 406 and to provide the account information to the server terminal device 406.

In some implementations, the user can use a laptop as the user terminal device 404. The laptop may access to a page showing an account payment service. For instances, the laptop may transmit the service authorization request to the server terminal device 406 if "auxiliary authentication" option is selected.

At 508, after receiving the service authorization request sent by the user terminal device 404, the server terminal device 406 may receive a certified service serial number and store the certified service serial number as well as a corresponding authentication record.

In some implementations, after receiving a service authorization request, the server terminal device 406 may generate a unique serial number for the service authorization. The server terminal device 406 may store the serial number locally, and transmit the certified service serial number to the user terminal device 404.

The server terminal device 406 may store the identity authentication record and the service serial number together. In some implementations, the service authorization request may include an identifier of the user terminal device 404 and/or an identifier of the service authorization. For example, the identifier of the user terminal device 404 and/or the identifier of the service authorization may be obtained from the service authorization request.

At 510, the user terminal device 404 may broadcast the received certification service serial number. For example, the laptop may receive a service serial number X from the server terminal device 406. The serial number may be used to authenticate the service carried on the service serial number X using Wi-Fi signals such that the serial number of the X authentication service may be broadcasted.

At 512, after receiving the certified service serial number, the auxiliary device for user authentication 402 may record a system local time and may generate an authentication token based on the recorded time and a stored random number seed. The authentication identification token may include verification information.

In some implementations, the auxiliary device for user authentication 402 may implement a secure hash algorithm (e.g., SHA-2). In these instances, the stored random number seed and the recorded time may be encrypted to generate an encrypted string as the authentication token for the user authentication.

For example, a mobile device may be used as the auxiliary device for user authentication 402. The auxiliary device for user authentication 402 may receive the certified service serial number X, and then gather information about the system local time, for example T0. The mobile device may implement SHA-2 to encrypt T0 and a random number W stored on the mobile device to generate an encrypted string (e.g., U0) as the authentication token.

At 514, the server terminal device 406 may receive, from the auxiliary device for user authentication 402, the user authentication token, the received service serial number, and the stored account information. For example, the mobile device may transmit authentication token U0, the received service serial number X and the account information to the server terminal device 406.

At 516, if the server terminal device 406 determines that the auxiliary authentication function is enabled, the operation of process 500 goes to operation 518. If the server terminal device 406 determines that the auxiliary authentication function is not enabled, process 500 terminates the authentication process.

In some implementations, the server terminal device 406 may determine that the transmitted authentication token is bound to an identifier indicating that the auxiliary authentication function is enabled. Then, the operation of process 500 goes to operation 518. If the server terminal device 406 may determine that the transmitted token is not bound to the identifier, process 500 terminates the authentication process.

At 518, based on the received account information, the server terminal device 406 may find the random number seed corresponding to the account information stored and collected in accordance with the random number seed and the system local time information to generate a verification authentication token. The server terminal device 406 may further determine and verify that the verification authentication token matches an identification authentication token. If the verification authentication token matches the identification authentication token, the operation of process 500 goes to operation 520. If the verification authentication token does not match the identification authentication token, the server terminal device 406 may inform the auxiliary device for user authentication 402 that the verification authentication token does not match the identification authentication token and may terminate the authentication process. The identification authentication token may include the registration information.

In some implementations, the server terminal device 406 may use the Secure Hash Algorithm (e.g., SHA-2) to perform cryptographic hash calculation on the random number seed and the current system time information to generate an encrypted string as the verification authentication token.

In some implementations, the system local time information for generating the identification authentication token (i.e., first time information) and the system local time to generate the verification authentication token (i.e., second time information) may not be the same. For example, the first time information may include time 10:52:30, and the second time information may include time 10:52:35. In such a case, when the verification authentication token is generated, the server terminal device 406 may determine a length of time delay transmission of the second time information and/or previously obtained statistic records. The server terminal device 406 may further determine a plurality of time points, and then generate verification authentication tokens based on the plurality of timing points. For example, if the length of the transmission delay time is 10 seconds and the second time is 10:52:35, the server terminal device 406 may select the 10 time points, namely 10:52:34, 10:52:33, 10:00 52 minutes and 32 seconds, 10:52:31, 10:52:30, etc. The server terminal device 406 may use the Secure Hash Algorithm (e.g., SHA-2) to perform encrypted hash calculation on the 10 time points to generate 10 verification authentication tokens. Further, the server terminal device 406 may verify these 10 tokens. If at least one of the 10 tokens matches the identification authentication token, the server terminal device 406 may determine that the verification authentication token matches the identification authentication token provided by the auxiliary device for user authentication 402. If none of the 10 token matches the identification authentication token, the server terminal device 406 may determine that the verification authentication token does not match the identification authentication token provided by the auxiliary device for user authentication 402

For example, the server terminal device 406 may determine whether the verification authentication token U1 and the identification authentication token U0 match based on the account information provided by the auxiliary device for user authentication 402. The server terminal device 406 may determine the random number seed W and the system time information T1 to generate verification authentication token U1. If U1 and U0 do not match, the server terminal may inform the auxiliary device for user authentication 402 (e.g., the mobile device) that the authentication failed and terminate the authentication process.

At 520, the server terminal device 406 may, based on the received certified service serial number, find the appropriate identity authentication record and obtain an identifier of the user terminal device 404. The server terminal device 406 may further authorize a service permission corresponding to the user identification information provided by the auxiliary device for user authentication 402. The server terminal device 406 may then inform the user terminal device 404 that the authorization is successful. In some implementations, if the identity authentication record contains a pending authorization service identifier, the service terminal device 406 may authorize a service permission corresponding to the pending authorization service identifier.

In some implementations, the server terminal device 406 may find the appropriate authentication records based on the received certified service serial number X. The server terminal device 406 may obtain authentication record IP addresses as an identified of a laptop, and then authorize a permission of the service to the laptop associated with the IP address.

At 522, after receiving the notification message that the authorization is successful, the server terminal device 406 may stop the broadcast of the service serial number, and provide a notification to users that the authorization is successful. For example, the server terminal device 406 may stop the broadcast of the service serial number, and display on a web page that the authorization is successful.

Figure 6:
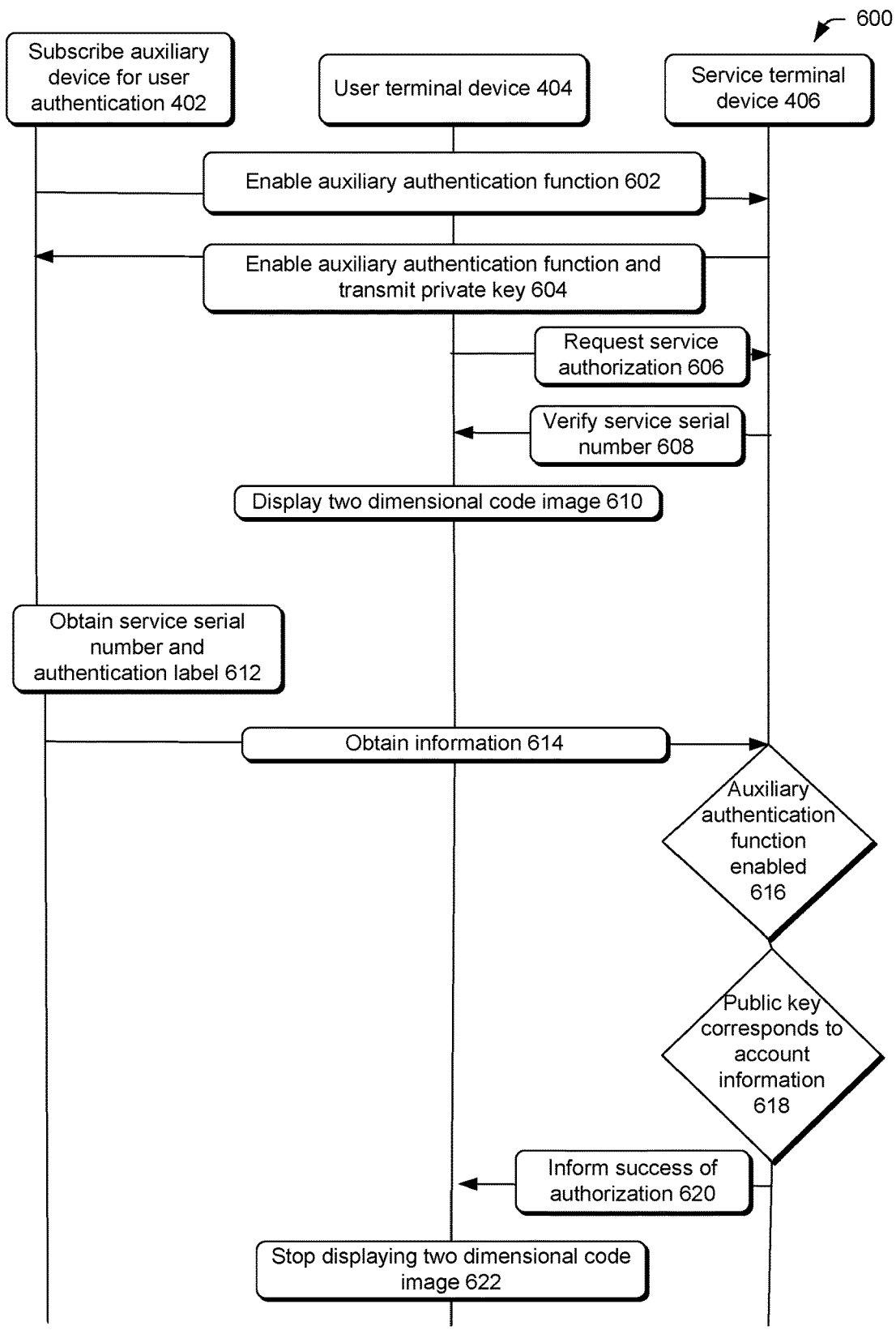
FIG. 6 is another schematic diagram of an illustrative process for service authorization.

FIG. 6 is another schematic diagram of an illustrative process for service authorization based on asymmetric encryption. At 602, an authentication auxiliary device may subscribe an auxiliary authentication function. For example, the auxiliary device for user authentication 402 may, in the user's control, log on the server terminal device 406 via an auxiliary authentication client application associated with the auxiliary device for user authentication 402. The auxiliary device for user authentication 402 may then transmit the request for enabling the auxiliary authentication function to the server terminal device 406. The request may include a user account and password, which are provided by a user.

At 604, the server terminal device 406 may enable the auxiliary authentication function, and create a pair of asymmetric private keys. The server terminal device 406 may transmit the private keys to the auxiliary device for user authentication 402 for storage, while storing the public keys corresponding to the private keys locally on the server terminal device 406.

In some implementations, the server terminal device 406 may store the account information and the public keys while the auxiliary device for user authentication 402 store the corresponding private keys and the account information.

At 606, the user terminal device 404 may request the service authorization. Additional one or more user terminal devices may be used to facilitate the service authorization request associated with the auxiliary device for user authentication 402.

Suppose that the user terminal device 404 is installed on a client terminal for service authorization for directing users to the application, and the client may provide "auxiliary authentication" and "non-auxiliary authentication" as options. When the user selects the "auxiliary authentication" option, the user terminal device 404 may generate the service authorization request and transmit the service authorization request to the server terminal device 406. When the user selects the "non-auxiliary authentication" option, the user terminal device 404 may request the user to enter account information to log on the server terminal device 406 and to transmit the account information to the server terminal device 406.

At 608, after receiving the service authorization request sent by the user terminal device 404, the server terminal device 406 may verify the service serial number and transmit a certified service serial number and/or store the certified service serial number as well as a corresponding authentication record.

In some implementations, after receiving the service authorization request, the server terminal device 406 may generate a unique serial number for the service authorization. The server terminal device 406 may store the serial number locally, and transmit the certified service serial number to the user terminal device 404.

The server terminal device 406 may store the identity authentication record and the service serial number together. For example, the service authorization request may include an identifier of the user terminal device 404 and/or an identifier of the service authorization. The identifier of the user terminal device 404 and/or the identifier of the service authorization may be obtained from the service authorization request.

At 610, the user terminal device 404 may broadcast the received certification service serial number, which may be displayed via a two-dimensional code image.

At 612, the auxiliary device for user authentication 402 may scan the two-dimensional code image to obtain the service serial number and the authentication label.

At 614, the auxiliary device for user authentication 402 may obtain the authentication label and sign the authentication label based on the stored private keys. The signed authentication label may be transmitted to the server terminal device 406 along with the stored account information.

At 616, if the server terminal device 406 determines that the auxiliary authentication function is enabled, the operation of process 600 goes to operation 618. If the server terminal device 406 may determine that the auxiliary authentication function is not enabled, the server terminal device 406 may inform the auxiliary device for user authentication 402 that the auxiliary authentication function is not enabled and then may terminate the authentication process.

In some embodiments, the server terminal device 406 may determine a transmitted token is bound to an identifier indicating that the auxiliary authentication function is enabled. If it is found that the token is bound to the identifier, the operation of process 600 goes to operation 618. If it is found that the token is not bound to the identifier, the service terminal device may terminate the authentication process.

At 618, based on the received account information, the server terminal device 406 may find the public key corresponding to the account information. The server terminal device 406 may receive the certified service serial number and find the authentication label corresponding to the certified service serial number. Further, the server terminal device 406 may decrypt the signed authentication label using the public keys. If the information to be certified derived from the public keys matches the stored authentication label derived from the user authentication information provided by the auxiliary device for user authentication 402, the operation of process 600 goes to operation 620. If the information to be certified derived from the public keys does not match the stored authentication label derived from the user authentication information provided by the auxiliary device for user authentication 402, the server terminal device 406 may inform the auxiliary device for user authentication 402 that the authentication fails and may terminate the authentication process.

At 620, the server terminal device 406 may, based on the received certified service serial number, find the appropriate identity authentication record and obtain an identifier of the user terminal device 404. The server terminal device 406 may further authorize a service permission corresponding to the user identification information provided by the auxiliary device for user authentication 402. The server terminal device 406 may then inform the user terminal device 404 that the authorization is successful.

In some implementations, if the identity authentication record contains a pending authorization service identifier, the server terminal device 406 may authorize a service permission corresponding to the pending authorization service identifier.

At 622, after receiving a notification message that the authorization is successful, the server terminal device 406 may stop the broadcast of the service serial number, and provide a notification to users that the authorization is successful. For example, the server terminal device 406 may stop displaying the two-dimensional code image.

Figure 7:
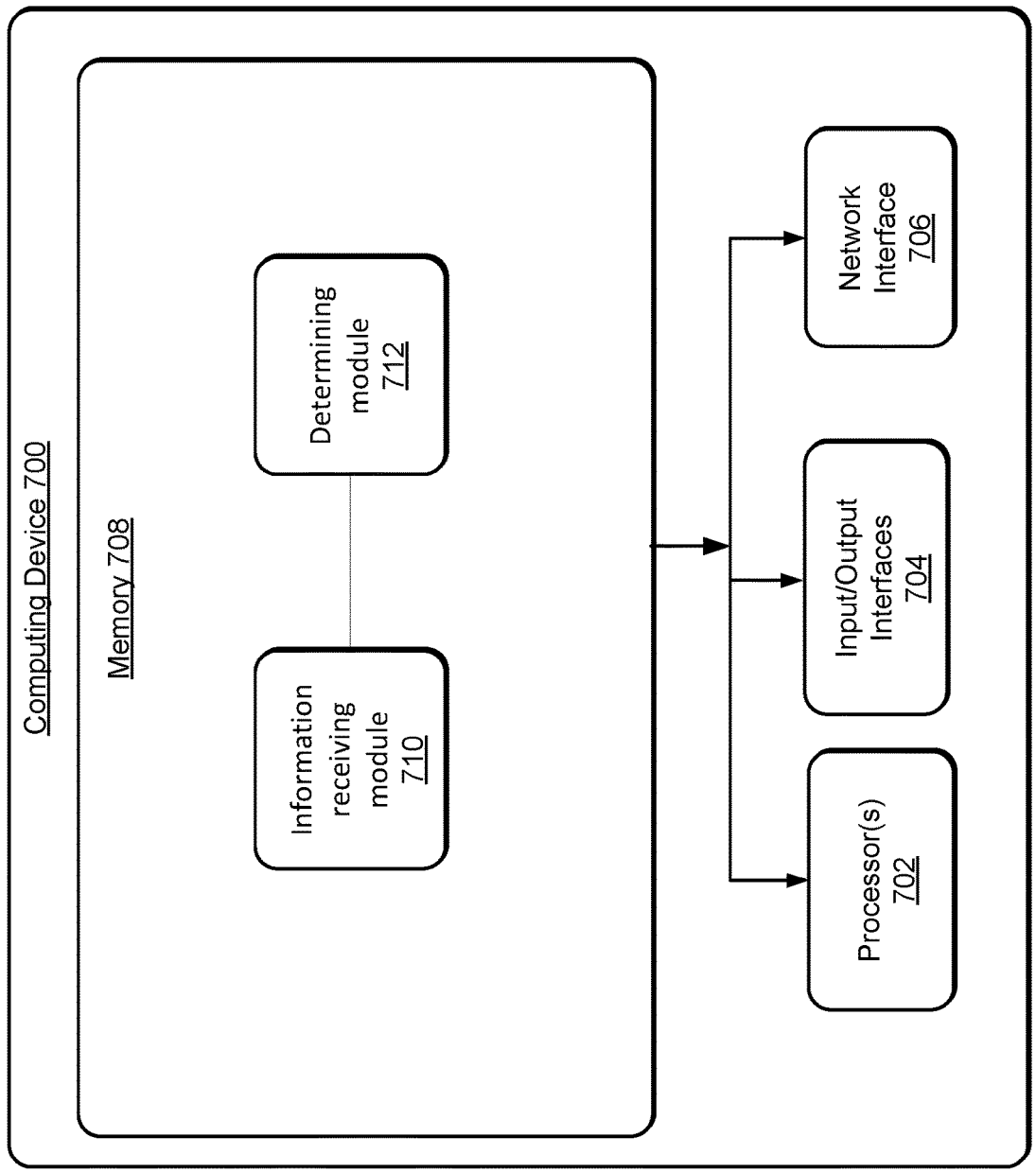
FIGS. 7-11 are schematic diagrams of illustrative computing architectures that enable service authorization.
Figure 8:
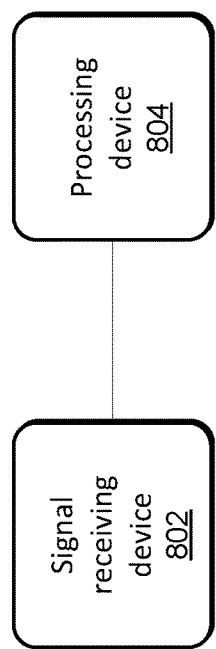

FIGS. 7-11 are schematic diagrams of illustrative computing architectures that enable service authorization. FIGS. 7 and 8 are diagrams of a computing device 700. The computing device 700 may be a user device or a server for a multiple location login control. In one exemplary configuration, the computing device 700 includes one or more processors 702, input/output interfaces 704, network interface 706, and memory 708.

The memory 708 may include computer-readable media in the form of volatile memory, such as random-access memory (RAM) and/or non-volatile memory, such as read only memory (ROM) or flash RAM. The memory 708 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 708 in more detail, the memory 708 may include an information receiving module 710 and a determining module 712. The information receiving module 710 is configured to receive and store user identification information from the auxiliary device for user authentication 402. The determining module 712 is configured to receive the user identification information and determine whether the user terminal device 404 meets the authentication condition.

In some embodiments, the memory 708 may further include a request receiving module (not shown) and a mapping module (not shown). Before the information receiving module 710 receives user authentication information, the request receiving module may receive the user authentication request. The user authentication request may include the identifier information of a user terminal device 404.

The mapping module is configured to generate the service serial number based on the user authentication request, and to establish the mapping relationship between the user authentication request and the service serial number. The mapping module may transmit the mapping relationship to the user terminal device 404.

The determining module 712 may determine, based on the identifier information of a user terminal device 404, whether the user terminal device 404 having the identifier information meet the authentication condition. The user authentication information may be sent by the auxiliary device for user authentication 402 directly or via the user terminal device 404.

In some implementations, as illustrated in FIG. 8, the computing device 700 may include a signal receiving device 802 and a processing device 804. The signal receiving device 802 may store the user authentication information of the auxiliary device for user authentication 402 associated with the user terminal device 404. The processing device 82 may receive the user authentication information and determine whether the user terminal device 404 meets the authentication condition.

An auxiliary device for user authentication 402 may store user authentication information such that the user terminal device 404 and/or an auxiliary device for user authentication 402 may transmit user identification information to the server terminal device 406. This makes the authorization process more efficiently.

Figure 9:
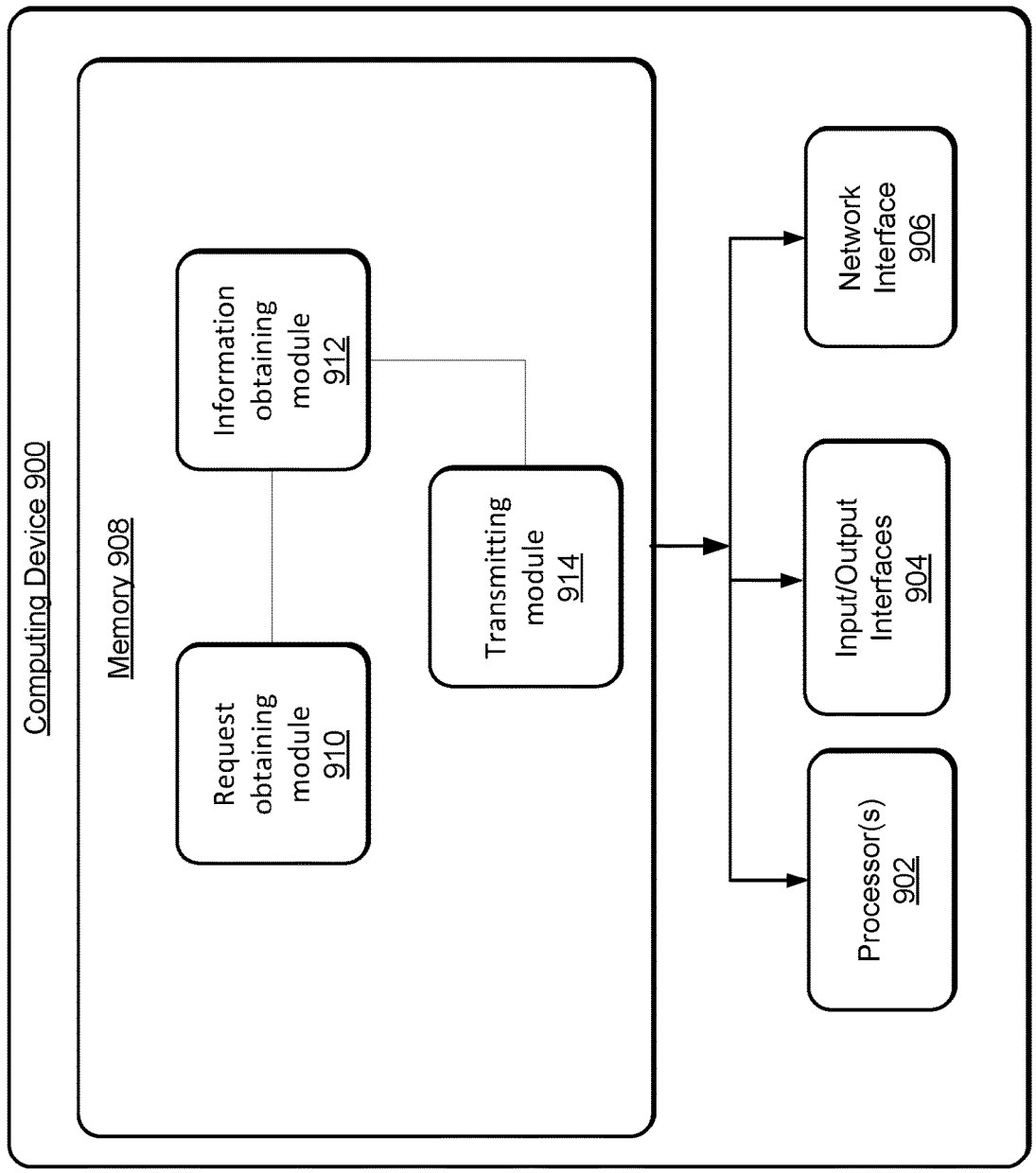
Figure 10:
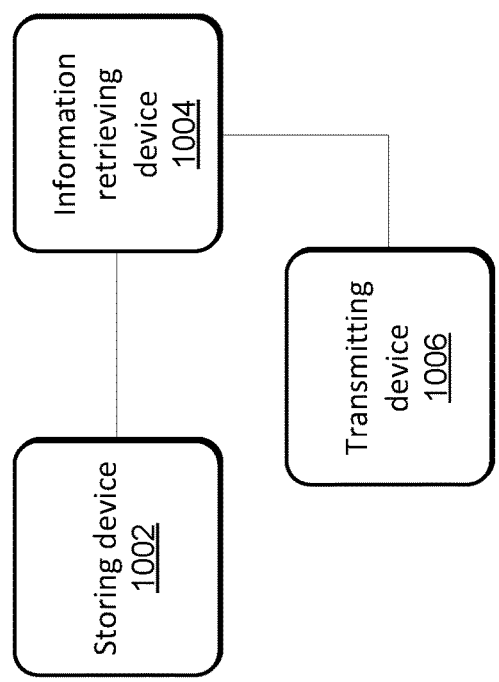

FIGS. 9 and 10 are diagrams of a computing device 900. The computing device 900 may be a user device or a server for a multiple location login control. In one exemplary configuration, the computing device 900 includes one or more processors 902, input/output interfaces 904, network interface 906, and memory 908.

The memory 908 may include computer-readable media in the form of volatile memory, such as random-access memory (RAM) and/or non-volatile memory, such as read only memory (ROM) or flash RAM. The memory 908 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 908 in more detail, the memory 908 may include a request obtaining module 910, an information obtaining module 912, and a transmitting module 914. The request obtaining module 910 is configured to receive the auxiliary authentication request of the user terminal device 404. The information obtaining module 912 is configured to obtain the user authentication information from the local device for authentication. The transmitting module 916 is configured to transmit the user authentication information to the server terminal device 406 such that the server terminal device 406 may determine whether the user terminal device 404 meets the authentication condition.

In some implementations, as illustrated in FIG. 10, the computing device 900 may include a storing device 1002, an information retrieving device 1004, and a transmitting device 1006. The storing device 1002 may store the user authentication information. The information retrieving device 1004 may retrieve the user authentication information after receiving the auxiliary authentication request from the auxiliary device for user authentication 402 associated with the user terminal device 404. The transmitting device 1006 may transmit the user authentication information to the server terminal device 406 such that the server terminal device 406 may determine, based on the user authentication information, whether the user terminal device 404 meets the authentication condition.

Figure 11:
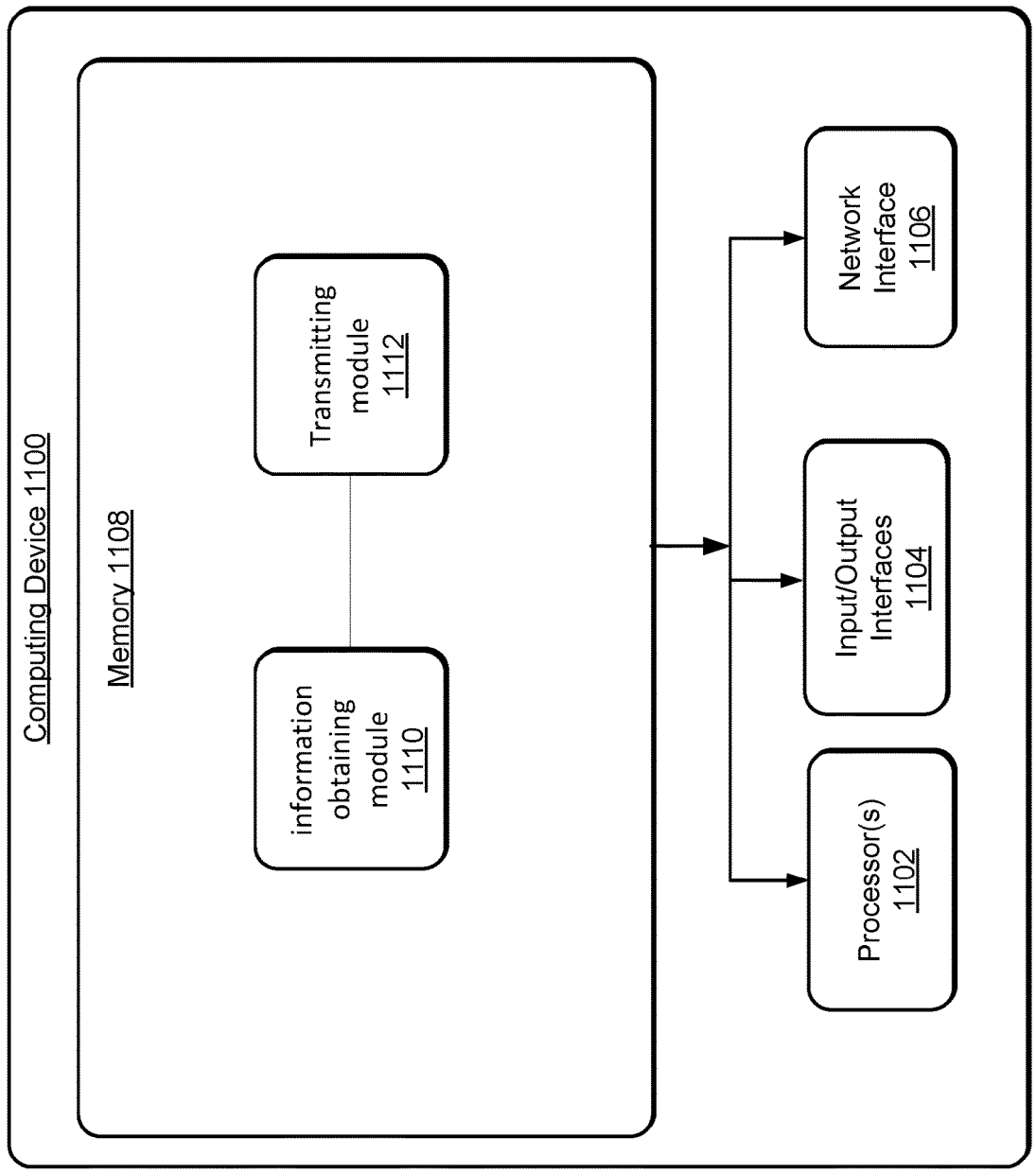

FIG. 11 is a diagram of a computing device 1100. The computing device 1100 may be a user device or a server for a multiple location login control. In one exemplary configuration, the computing device 1100 includes one or more processors 1102, input/output interfaces 1104, network interface 1106, and memory 1108.

The memory 1108 may include computer-readable media in the form of volatile memory, such as random-access memory (RAM) and/or non-volatile memory, such as read only memory (ROM) or flash RAM. The memory 1108 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 1108 in more detail, the memory 1108 may include an information obtaining module 1110 and a transmitting module 1112. The information obtaining module 111 is configured to obtain the user authentication information from the auxiliary device for user authentication 402 associated with the authentication device. The transmitting module 112 is configured to transmit the user authentication information to the user terminal device 404 such that the server terminal device 406 may determine, based on the user authentication information, whether the authentication device meets the authentication condition.

In some implementations, the memory 1108 may include provisioning module (not shown) configured to transmit the auxiliary authentication request to the auxiliary device for user authentication 402 such that the auxiliary device for user authentication 402 may transmit the user authentication information to the server terminal device 406.

In some implementations, the computing device 1100 may further include information previsioning device (not shown). The information previsioning device may provide the user authentication information associated with the auxiliary device for user authentication 402 such that the auxiliary device for user authentication 402 may transmit the user authentication information to the server terminal device 406.

In some implementations, the computing device 1100 may include an information retrieving device (not shown) and a signal transmitting device (not shown). The information retrieving device may transmit the user authentication information to the user terminal device 404 such that the server terminal device 406 may determine, based on the user authentication information, whether the authentication device meets the authentication condition.

The implementations are merely for illustrating the present disclosure and are not intended to limit the scope of the present disclosure. It should be understood for persons in the technical field that certain modifications and improvements may be made and should be considered under the protection of the present disclosure without departing from the principles of the present disclosure.

What is claimed is:

1. A method for service authorization, the method comprising:
receiving, by one or more processors of a server terminal device, user authentication information that is stored on an auxiliary device for user authentication associated with a user terminal device, the user authentication information comprising an authentication token, wherein the authentication token includes encrypted information generated from a first system local time when the auxiliary device receives an auxiliary authentication request from the user terminal device and a random number seed;
determining that an auxiliary authentication function is enabled for the auxiliary device in response to determining that the authentication token is bound to the identifier of the user terminal device; and
determining whether the user terminal device meets an authorization condition based on the user authentication information, determining whether the user terminal device meets the authorization condition comprising determining whether the authentication token included in the user authentication information matches any one of a plurality of verification authentication tokens generated by the server terminal device, the plurality of verification authentication tokens being generated by encrypting the random number seed and a plurality of timing points associated with a second system local time when the server terminal device receives the user authentication token.

2. The method of claim 1, further comprising:
receiving a request for user authentication prior to receiving the user authentication information, the user authentication request including identifier information of the user terminal device;
generating a service serial number based on the user authentication request, the service serial number having a mapping relationship with the user authentication request; and
wherein the determining whether the user terminal device meets the authorization condition further comprises:
determining the service serial number corresponding to the user authentication request;
identifying the user terminal device based on the identifier information of the user terminal device;
determining whether the user terminal device meets the authorization condition.

3. The method of claim 1, wherein the user authentication information further comprises user identification information, and the method further comprises:
transmitting a private key to the user terminal device after verification of the user identification information; and
transmitting an authentication label to the auxiliary device for user authentication via the user terminal device after receiving a request for user authentication.

4. The method of claim 3, wherein the user authentication information further comprises verification information, and determining whether the user terminal device meets the authorization condition further comprises:
identifying the user identification information corresponding to a public key;
decrypting the verification information using the public key to obtain information to be certified;
determining whether the information to be certified matches the authentication label based on the user authentication information;
determining that the user terminal device meets authorization conditions in response to a determination that the information to be certified matches the authentication label; and
determining that the user terminal device does not meet authorization conditions in response to a determination that the information to be certified does not match the authentication label.

5. The method of claim 1, wherein the user authentication information is provided by the auxiliary device for user authentication to the server terminal device.

6. The method of claim 1, wherein the user authentication information is obtained from the user terminal device or the auxiliary device for user authentication and transmitted by the user terminal device to the server terminal device.

7. The method of claim 1, wherein the auxiliary device for user authentication comprises at least one of a mobile phone, a desktop computer, a laptop, or a tablet.

8. The method of claim 1, wherein the auxiliary device for user authentication and user terminal device exchange information using sound waves.

9. The method of claim 1, wherein the user authentication information further comprises a user name and a password.

10. A method for requesting authorization, the method comprising:
- receiving, by one or more processors of an auxiliary device for user authentication, an auxiliary authentication request from a user terminal device associated with the auxiliary device for user authentication;
- obtaining user authentication information that is stored on the auxiliary device for user authentication, the user authentication information comprising an authentication token, wherein the authentication token includes encrypted information generated from a first system local time when the auxiliary device receives the auxiliary authentication request from the user terminal device and a random number seed; and
- transmitting the user authentication information to a server terminal device such that the server terminal device determines whether the user terminal device meets an authentication condition based on the user authentication information by determining whether the authentication token included in the user authentication information matches any one of a plurality of verification authentication tokens, the plurality of verification authentication tokens being generated by encrypting the random number seed and a plurality of timing points associated with a second system local time when the server terminal device receives the user authentication token.

11. The method of claim 10, wherein the user authentication information that is stored on the auxiliary device for user authentication is transmitted directly to the server terminal device.

12. The method of claim 10, wherein the user authentication information is transmitted from the auxiliary device for user authentication to the server terminal device via the user terminal device.

13. A system for service authorization, the system comprising:
- a server terminal device, wherein the server terminal device comprises:
  - one or more processors; and
  - memory including instructions that, when executed by the one or more processors, cause the one or more processors to perform acts comprising:
    - receiving user authentication information that is stored on an auxiliary device for user authentication associated with a user terminal device, the user authentication information comprising an authentication token, wherein the authentication token includes encrypted information generated from a first system local time when the auxiliary device receives an auxiliary authentication request from the user terminal device and a random number seed;
    - determining that an auxiliary authentication function is enabled for the auxiliary device in response to determining that the authentication token is bound to the identifier of the user terminal device; and
    - determining whether the user terminal device meets an authorization condition based on the user authentication information, determining whether the user terminal device meets the authorization condition comprising determining whether the authentication token included in the user authentication information matches any one of a plurality of verification authentication tokens generated by the server terminal device, the plurality of verification authentication tokens being generated by encrypting the random number seed and a plurality of timing points associated with a second system local time when the server terminal device receives the user authentication token.

14. The system of claim 13, wherein the acts further comprise:
- receiving a request for user authentication prior to receiving the user authentication information, the user authentication request including identifier information of the user terminal device; and
- generating a service serial number based on the user authentication request, the service serial number having a mapping relationship with the user authentication request; and
- wherein the determining whether the user terminal device meets an authorization condition further comprises:
  - determining the service serial number corresponding to the user authentication request based on the user authentication information;
  - identifying the user terminal device based on the identifier information of the user terminal device; and
  - determining whether the user terminal device meets the authorization condition.

15. The system of claim 13, wherein the user authentication information is provided by the auxiliary device for user authentication the server terminal device.

16. The system of claim 13, wherein the user authentication information is obtained from the auxiliary device for user authentication and transmitted by the user terminal device to the server terminal device.

17. The system of claim 13, wherein the auxiliary device for user authentication comprises at least one of a mobile phone, a desktop computer, a laptop, or a tablet.

18. The system of claim 13, wherein the auxiliary device for user authentication and the user terminal device exchange information by implementing sound waves.

* * * * *